(12) United States Patent
Wood

(10) Patent No.: US 6,560,951 B1
(45) Date of Patent: May 13, 2003

(54) BOOT FOR LIVESTOCK

(76) Inventor: Gary Adrian Wood, 195 B Rautawhiri Road, Helensville RD2 1451 (NZ)

( * ) Notice: Subject to any disclaimer, the term of this patent is extended or adjusted under 35 U.S.C. 154(b) by 0 days.

(21) Appl. No.: 09/959,233
(22) PCT Filed: Apr. 20, 2000
(86) PCT No.: PCT/NZ00/00059
§ 371 (c)(1),
(2), (4) Date: Oct. 22, 2001
(87) PCT Pub. No.: WO00/64248
PCT Pub. Date: Nov. 2, 2000

(30) Foreign Application Priority Data

Apr. 22, 1999 (NZ) .................................. 335357

(51) Int. Cl.⁷ ................................................. A01L 3/00
(52) U.S. Cl. ............................................. 54/82; 168/18
(58) Field of Search ............................ 54/82; 168/1, 2, 168/3, 18

(56) References Cited

U.S. PATENT DOCUMENTS 3,794,119 A * 2/1974 Paiso et al. .................... 168/18
5,816,032 A * 10/1998 Vogt .............................. 54/82
6,062,008 A * 5/2000 Nor ............................... 54/82

* cited by examiner

*Primary Examiner*—Robert P. Swiatek
(74) *Attorney, Agent, or Firm*—Young & Thompson

(57) ABSTRACT

A flexible boot (10) for use with livestock comprising a flat sole (13) made of a relatively harder material and a relatively resilient and extensible wall (11) having the shape of a truncated cone. The wall (11) includes a fastening element comprising (a) an outer fastenable surface and (b) one or more flexible non extensible straps (14,15) attached at one end to the wall (11) and having a reversible hook and eye fastener elements capable of forming a reversible attachment along their length to the wall (11) so that the boot (10) may be fitted over a hoof. In use the boot (10) forms a substantially sealed cavity (19) around the hoof and medication may be introduced into the cavity (19).

10 Claims, 2 Drawing Sheets

BOOT FOR LIVESTOCK

CROSS REFERENCE TO RELATED APPLICATION

Figure 2:
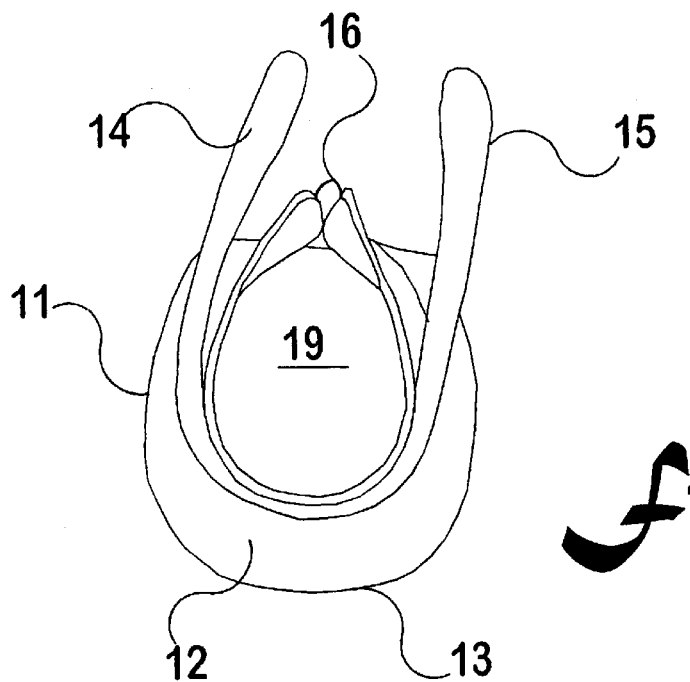

This is the 35 U.S.C. §371 national stage of international application PCT/NZ00/00059 filed on Apr. 20, 2000, which designated the United States of America.

FIELD

This invention relates to a type of enclosed foot-bandage or protective boot for use principally in conjunction with animals such as horses, sheep, and cows.

BACKGROUND

Animals such as horses or cows periodically suffer foot disease often initially as a result of unintentional contact with, and perhaps penetration by objects lying on or partially embedded within the ground. The existence of a horse shoe is no protection. Some forms of damage may result in bruising of the underlying tissues and some may result in the introduction of infection, leading to purulent abscesses, tetanus, or other sequels. Subclinical losses in milk production particularly in younger cows in New Zealand is commonly caused by the effects of stone bruises. The younger cows are pushed around by bossy lead cows while walking along a stony race to reach the cowshed. Furthermore, there are a number of foot conditions which are believed to arise independently of actual contact trauma, including laminitis. One cause of laminitis in the horse is poisoning with wood shavings from the black walnut *Juglans niger*. Footrot in sheep can comprises a serious cause of lameness and treatment is often by paring back the affected hoof. There is a need to protect trimmed hooves particularly of valuable sheep.

A number of foot-bandages or enclosed boots exist for use with animals such as horses and cows; either for applying medication to a hoof, or for protecting the hoof from further damage, or to serve both functions together are known, but none appear to to provide a satisfactory solution to the problem. One of the most relevant prior art documents is U.S. Pat. No. 5,174,482 to Wright for a pressurisable foot bandage and pump to reduce laminitis. Like many others, e.g. Glass et al, U.S. Pat. No. 5,661,958 "Size-adjustable composition horseboot" and Glass, U.S. Pat. No. 4,174,754 "Adjustable boot-type composition horseshoe" it depends on a metal clasp like those used in ski bindings to tighten up laces to hold the boot in place. Origgi et al EP 0 651 942, teach a hoof-enclosing boot having adaptations for an existing horse shoe which is held in place by resilience plus engagement about the protruding rear parts of the horse shoe. Rice U.S. Pat. No. 5,600,940 "Apparatus for applying lotion to a hoof" teaches a conical absorbent bandage, capable of being impregnated with some lotion, which fits over the hoof up to about as far as the coronary band and is held in place with "hook and eye" (Velcro) fasteners in the form of circumferential straps. Nothing at all goes under the hoof and it is not easy to appreciate how the device would stay in place.

The problem to be solved could be stated as "how can a durable, retainable enclosed boot for use on a hoofed animal be provided, so that medication can be applied to a diseased hoof or so that the hoof can be protected for a period".

OBJECT

It is an object of this invention to provide an improved foot-bandage or enclosed boot for protection of a hoof of an animal, or at least to provide the public with a useful choice.

STATEMENT OF INVENTION

In a first broad aspect the invention provides a flexible boot for covering a hoof of an animal, wherein the boot includes (a) a pliable base having an upper surface, and (b) a resilient upper, attached about an outer periphery of the pliable base and having an anterior and a posterior aspect; the resilient upper having on substantially the entire outer surface a first fastenable surface of the "complementary hook and eye" type; the resilient upper also having (c) boot attachment means comprising at least one set of flexible and substantially non-extendible straps having at least one complementary fastenable surface of the "hook and eye" type; the straps thereby being capable in use of forming a reversible attachment with any portion of the resilient upper and thereby holding the flexible boot on to the hoof of the animal.

In a related aspect the invention further provides a flexible boot as previously described in this section, wherein the pliable base comprises a relatively hard sole capable in use of bearing the weight of the animal; the resilient upper comprises a relatively soft material produced upwardly from the base so as to have a shape of a posteriorly slanted, truncated cone having a height sufficient in use to cover the hoof to about the position of the coronet; the upper further including reversible boot attachment means comprising in combination (a) provision of the first fastenable surface and (b) provision of at least one strap; each strap being permanently attached at one end to the anterior, outer surface of the upper and each strap having on an inner side a second fastenable surface capable in use of forming a reversible attachment with any part of the first fastenable surface, so that in use the hoof can be placed in the boot and then held in the boot by laying the straps over the upper while applying tension to them, whereupon the non-extendable straps, once attached, prevent the upper from sliding off the hoof.

In a related aspect, the first fastenable surface and the second, complementary fastenable surface comprise a "hook and eye" type of complementary fastenable surface for example "Velcro"(TM).

Preferably the upper is made from a "Neoprene" foam sheet bearing on its outer surface a first fastenable surface.

Preferably a set of one or more flexible non-extendible strips comprises two major strips and one minor strip.

Preferably each permanently attached end of a strap is also attached to an end of another strap, so that the straps together comprise a non-extendible band.

Preferably the permanent attachment of the two major strips is low on the anterior surface of the boot, and each attached end of each major strip is attached to the other, each major strip extends in a direction opposite to that of the other, and the free end of each strip is orientated towards the rear of the boot so that the major strips, if reversibly attached to the wall, are orientated along the lines of stresses caused within the boot during use.

Preferably the third, minor strip has at one end an attachment point 18 high at the rear of the wall, and the strip is orientated horizontally, and the free end is capable of attachment to the wall about the rear of the hoof so that the hoof may be initially held in place.

Preferably at least one of the straps also has an outer side covered with the first fastenable surface.

Preferably the free edge of the upper is provided with an at least partial notch at the posterior aspect; the notch being provided with a flexible non-extendable strap capable of bridging the notch; the strap being fixed at one end near to an edge of the notch and having along an inner side the second, complementary fastenable surface.

Optionally a rigid material may be included within the pliable base of the boot and about the periphery of the base, so that if an animal bears weight on a diseased hoof, the rigid material is capable of transferring a proportion of the weight on to unaffected parts of the hoof.

Preferably the rigid material has a shape resembling a horse shoe, so that if a cow having one infected claw bears weight, the hard material transfers a proportion of the weight on to the unaffected claw.

In a second broad aspect the invention provides a method of covering a hoof of an animal using the flexible boot as previously described in this section, the method including the steps of (1) fitting an open boot over a hoof, (2) closing the notch by pulling the notch strap across the notch and pushing the strap onto the outer surface of the upper, (3) pulling on each strap while bringing the strap into contact with the upper around the side of the hoof, thereby effecting fastening and so converting the resilient wall into a non-extendible and closely fitting flexible wall so that (a) the boot cannot separate from the hoof and (b) the boot forms a substantially sealed cavity around the hoof.

In a related aspect the invention provides a method of applying medication to a hoof to be treated using the flexible boot as previously described in this section, including an additional step of putting the medication into the flexible boot so that the medication lies within the substantially sealed cavity around the hoof.

In another related aspect the invention provides a method for use of a boot as described previously in this section for applying a medication to a diseased hoof over a period, the method including the steps of first treating, paring, drilling, opening, and cleaning up as appropriate for the current disease, selecting a boot having suitable dimensions, optionally applying an appropriate medication, placing the boot over the hoof, tightening the minor strap at the rear by pulling and pressing the minor strap over the wall, then tightening and pressing the major straps firmly about the wall on each side thereby enclosing the hoof in an enclosed boot together with medication.

After use, the boot may optionally be washed, disinfected, and dried out for re-use.

In a third broad aspect the invention provides a method for manufacture of a boot according to the invention, wherein the method includes the steps of moulding a base from a resilient material and moulding a wall on to the base, then of attaching one or more strips to the wall.

A preferred base material is a moulded rubber.

Optionally the base may be coated with a coating of urethane.

Optionally the side wall may be moulded to the base in a single operation.

Optionally the strap or straps may be sewn to the side wall in a selected position.

In a fourth broad aspect this invention provides a substantially enclosed boot for an animal; the boot being made of a resilient material; the base being made of a material having a lower "give" and adapted to bear the weight of the animal and having a side wall, produced upward from the base and inwardly, the side wall being made of a relatively more resilient material and having a shape adapted when in use to form a substantially sealed cavity above the base and around the hoof, the sides further including fastening means.

PREFERRED EMBODIMENT

The description of the invention to be provided herein is given purely by way of example and is not to be taken in any way as limiting the scope or extent of the invention.

DRAWINGS

Figure 1:
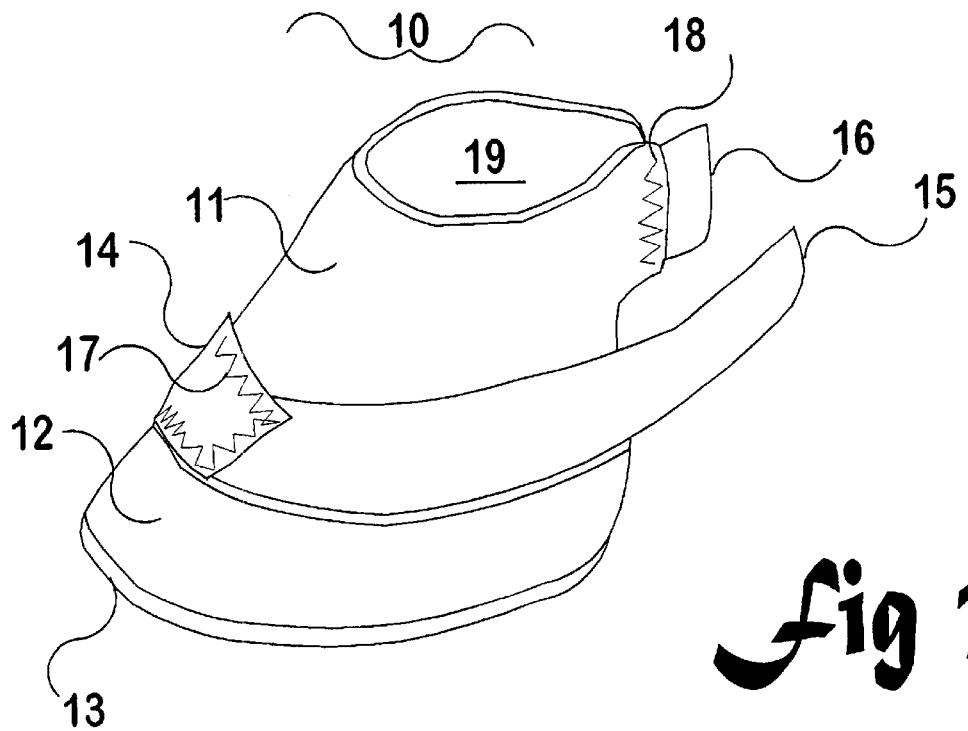

FIG. 1: A perspective view of a stock boot according to the invention.

FIG. 2: A plan view of the stock boot.

Figure 3:
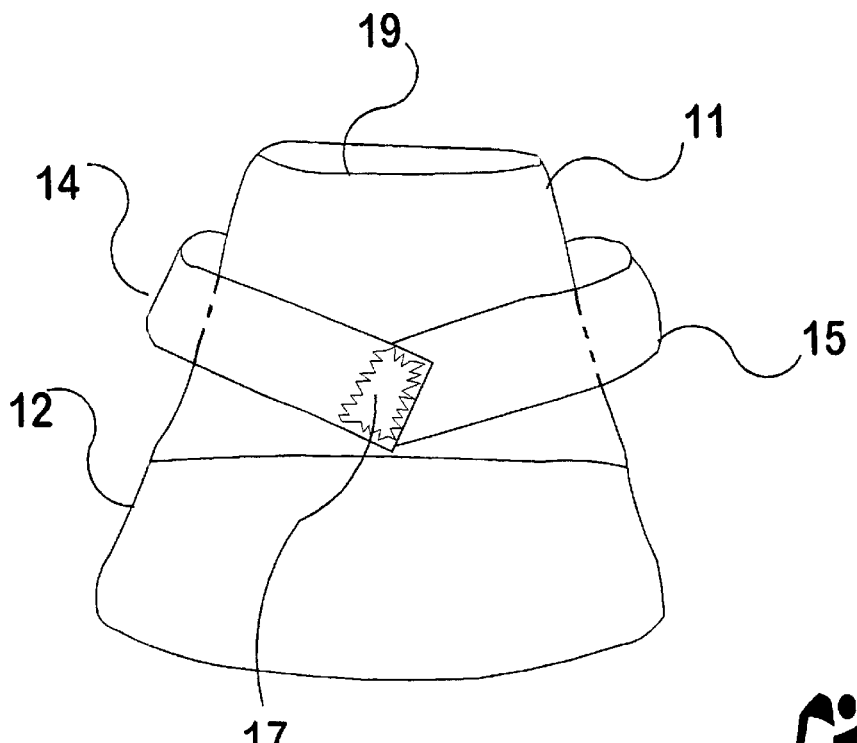

FIG. 3: A front view of the stock boot.

Figure 4:
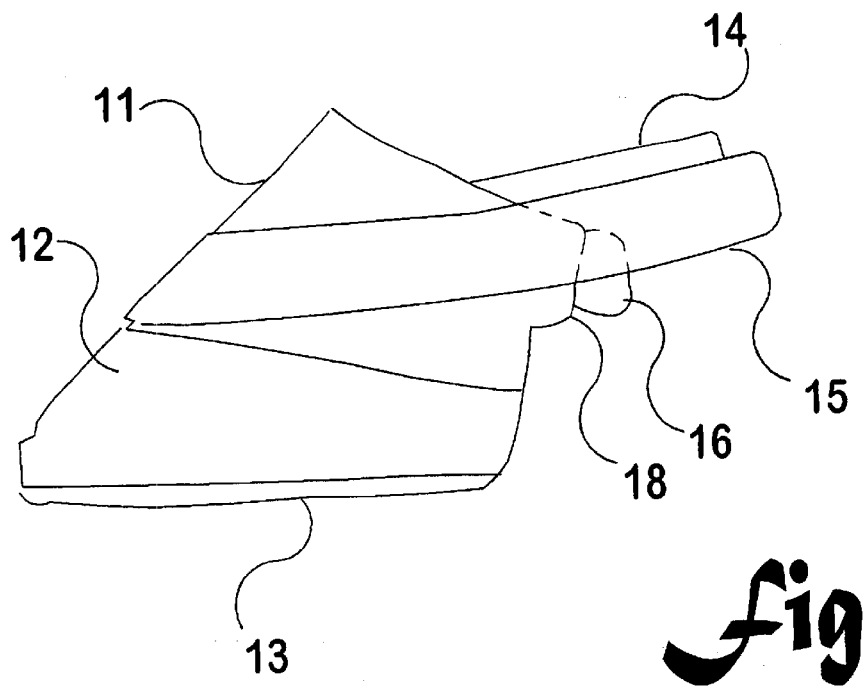

FIG. 4: A side view of the stock boot.

This invention relates to a substantially enclosed boot—including a sole and an upper—according to this invention. The boot is intended to encompass a hoof of an animal, reaching up to the coronet and to protect the hoof while optionally exposing the hoof to some sort of medication, in liquid or semiliquid form.

While most trials to date have been in relation to race horses, it may be used on other kinds of horse, on cattle, on sheep, deer, goats and pigs, or any other animal having a foot of similar proportions and an "asymmetric truncated cone" shape. Elephants will require a large boot; goats will require a small one. For those animals of "lower individual intrinsic value" the device is still relevant in the case of stud animals for example. It should be remembered that the boot has significant flexibility and one size fits a range of hoof sizes.

The boot is made of a resilient material throughout, although the base is made of a more wear-resistant material having a lower modulus of elasticity and adapted to bear the weight of the animal in use. The base may include a raised wall in order to assist in forming a bond with the side wall material. The base may include an either totally included or partially exteriorised hard wearing/support device such as a horse shoe. The side wall is composed of a softer material such as that used for diving wet suits—a "Neoprene foam rubber, preferably with an outer surface capable of acting as the "eyes" of a hook-and-eye set of complementary materials (for example: "Velcro (TM)). The wall is produced upward from the base and inwardly so as to approximately conform with the shape of the hoof; adapted when in use to form a substantially sealed cavity above the base and around the hoof.

The wall of a non-attached boot is incomplete. The act of strapping the boot to the hoof completes the sealing operation.

The fastening means comprises at least one strap made of a resilient material; the strap being provided with surface fastening means capable of forming a reversible attachment on to the outer surface of the side wall.

We have found that a symmetrical arrangement of straps (see FIG. 2: 14 and 15) makes the boot more easily attachable to a hoof. The straps cause a fairly even pressure to be applied over a whole hoof—whereas prior art boots tended to apply local pressure which may cause significant pain such as in a hoof being treated for laminitis or an infection.

Each strap has been given an optimised placement and dimensions such that it is capable of forming an adequate attachment about the majority of the side wall.

Both straps are anchored at a forwards location; a central, permanent, anchor portion (17—see FIGS. 1 and 3)

Optionally a hard material may be included within the base of the boot and preferably this inclusion covers most or all of the sole. This has addition uses; for example so that if a cow having one infected claw bears weight on that claw, the hard material transfers a proportion of the weight on to the unaffected claw.

Optionally the base may be coated with a coating of urethane.

Optionally the side wall may be moulded to the base in a single operation.

Optionally the strap or straps may be sewn to the side wall in a selected position.

EXAMPLE 1

See the horse example illustrated in FIGS. 1 to 4 The boot 10 is made of a bonded sole 13 and upper 11, the upper being made of a "Neoprene" rubber having a "Velcro" finish. The straps (14, 15) that hold the boot onto the hoof are made of a double sided Velcro finish. The sole may also be moulded as a part of the neoprene upper. The flexibility of the Neoprene allows for comfort but is bound firmly in place by the configuration of the Velcro straps (herein also called the "major strips") and the tag 16 at the rear of the boot (herein also called the "minor strip"). The bonded sole 13 is preferably made of a wear resistant material (and preferably good enough to last for a couple of days if used as an emergency shoe in pony trekking) whereas the upper, which is designed to conform closely to the hoof when in use, is generally made of a flexible, absorbent material. The outer surface 11 has the Velcro finish over substantially the whole surface. A typical thickness is 5 mm. The inner surface, bounding the cavity 19, has a cloth layer, giving the upper greater resistance to possibly quite significant stresses. The circumferential zone 12 above the sole 13 is preferably provided with a smooth coating for better resistance to dirt and for some waterproofing which might dilute any internally added treatment. Urethane is a preferred coating for the underneath of the sole and also to cover the zone 12.

The Velcro straps provide for ease of use, in that the boot can easily be attached or removed. The position of the straps and rear opening allow for the boot to fit many different animals. Trials have resulted in satisfactory reports in all cases.

VARIATIONS

"Velcro" is a trade mark for a type of fastener in which one possibly flexible surface carrying hooks can reversibly be attached to a second surface bearing compatible eyes. Other types of surface-to-surface fastener, whether based on the hook-and-eye model or on some other form, such as self-amalgamating tape, may be used. Similarly the "Neoprene" rubber of the walls may be substituted with other materials. The rubber sole may include metal gripping elements like studs.

COMMERCIAL BENEFITS OR ADVANTAGES

The boot is light and flexible, so can be folded and packed in a saddle roll and carried with a pack for a journey. The boot is easy to apply, holds firmly, and stays on for an extended period. It is reusable. One size of boot, being largely resilient, suits a variety of hoof sizes. Velcro straps can be applied with one hand, useful when a person is holding the animal's hoof on his/her knees without assistance from others.

The boot is absorbent (the preferred material being a spongy rubber) and a dose of medication can be released over a period.

Although several preferred examples as described above have been disclosed for illustrative purposes, those skilled in the art will appreciate that various modifications, additions, and substitutions are possible without departing from the scope and spirit of the invention as set forth in the following claims.

I claim:

1. A flexible boot for covering a hoof of an animal, the boot comprising:

a pliable base of a relatively hard material, having an upper surface;

a resilient upper attached about an outer periphery of the pliable base, and having an anterior and a posterior aspect;

the resilient upper having on substantially the entire outer surface a first fastenable surface of the "complementary hook and eye" type;

the resilient upper also having boot attachment means comprising at least one set of flexible and substantially non-extendable straps having at least one complementary fastenable surface of the "hook and eye" type;

the straps thereby being capable in use of forming a reversible attachment with any portion of the resilient upper, and thereby holding the flexible boot over the hoof of the animal in a manner providing a substantially sealed cavity around the hoof.

2. The flexible boot according to claim 1, wherein the pliable base comprises a relatively hard sole capable in use of bearing the weight of the animal; the resilient upper comprising a relatively soft material produced upwardly from the base so as to have a shape of a posteriorly slanted, truncated cone having a height sufficient in use to cover the hoof to about the position of the coronet; the boot attachment means comprising in combination the first fastenable surface and at least one strap; each strap being permanently attached at one end to the anterior, outer surface of the upper and each strap having on an inner side a second fastenable surface capable in use of forming a reversible attachment with any part of the first fastenable surface, so that in use the hoof can be placed in the boot and then held in the boot by laying the straps over the upper while applying tension to them, whereupon the non-extendable straps, once attached, prevent the upper from sliding off the hoof.

3. The flexible boot according to claim 1, wherein the resilient upper is made from a rubber foam sheet bearing on substantially the entire outer surface a first fastenable surface of hook and eye fabric elements.

4. The flexible boot according to claim 1, wherein at least one of the straps also has an outer side covered with the first fastenable surface.

5. The flexible boot according to claim 4, wherein the anterior surface of the upper comprises a permanent attachment for permanently attaching one end of each strap, and a free end of each strap is orientated towards the rear of the boot.

6. The flexible boot according to claim 5, wherein each permanently attached end of a strap is also attached to another strap, so that the straps together comprise a non-extendable band.

7. The flexible boot according to claim 6, wherein a free edge of the upper is provided with an at least partial notch at the posterior aspect; the notch being provided with a flexible non-extendable notch strap capable of bridging the notch; the notch strap being fixed at one end near to an edge of the notch and having along an inner side the second, complementary fastenable surface.

8. A flexible boot according to claim 7, wherein a rigid material is included within the pliable base of the boot and about the periphery of the base, so that if an animal bears weight on a diseased hoof, the rigid material is capable of transferring a proportion of the weight on to unaffected parts of the hoof.

9. A method of covering a hoof of an animal using a flexible boot according to claim 7, which comprises:

fitting an open boot over a hoof;

closing the notch by pulling the notch strap across the notch, and pushing the notch strap onto the outer surface of the upper;

pulling on each strap while bringing the strap into contact with the upper around the side of the hoof, thereby effecting fastening and so converting the resilient wall into a non-extendible and closely fitting flexible wall so that the boot cannot separate from the hoof and the boot forms the substantially sealed cavity around the hoof.

10. The method according to claim 9, further comprising an additional step of placing medication into the flexible boot, so that the medication lies within the substantially sealed cavity around the hoof.

* * * * *